Figure 1:
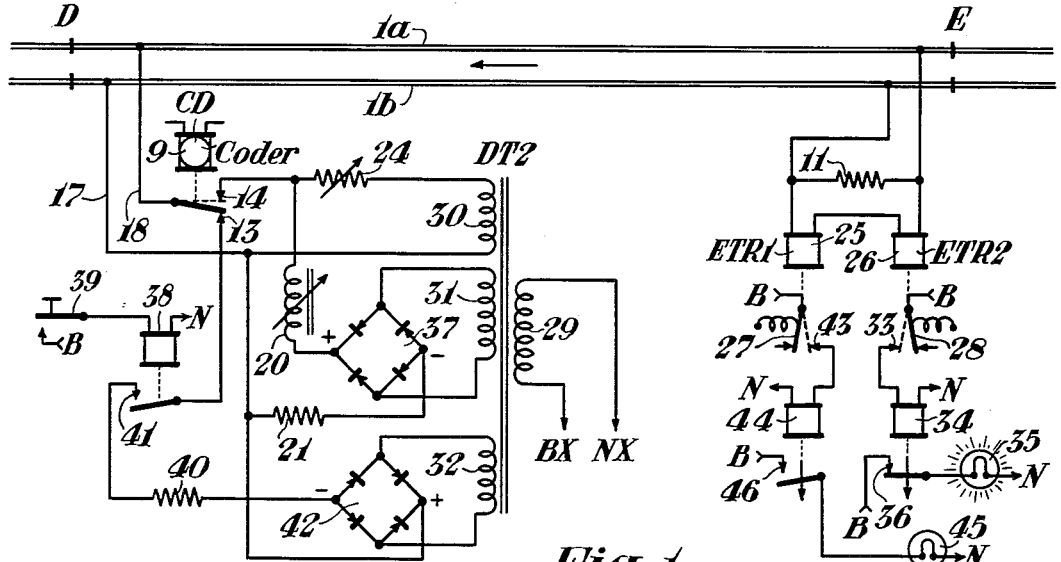

July 10, 1956 — P. N. MARTIN — 2,754,413
TRACK CIRCUIT APPARATUS

Original Filed Dec. 3, 1948 — 2 Sheets-Sheet 1

INVENTOR.
Paul N. Martin
BY
W. L. Stout.
HIS ATTORNEY

INVENTOR.
Paul N. Martin
BY
W. L. Stout
HIS ATTORNEY

United States Patent Office 2,754,413
Patented July 10, 1956

2,754,413

TRACK CIRCUIT APPARATUS

Paul N. Martin, Penn Township, Allegheny County, Pa., assignor to Westinghouse Air Brake Company, Wilmerding, Pa., a corporation of Pennsylvania Original application December 3, 1948, Serial No. 63,262. Divided and this application January 23, 1952, Serial No. 267,763

10 Claims. (Cl. 246—34)

My invention relates to track circuit apparatus, and more particularly to track circuit apparatus for controlling both wayside and cab signals.

The present application is a division of my copending application Serial No. 63,262, filed December 3, 1948, for Improvements in Track Circuit Apparatus, now abandoned.

In railway signal systems the track circuit of a track section is frequently supplied with direct current for energizing the track relay when the section is unoccupied and with alternating current for operating a cab signal when a train occupies the section. Safety requirements of railway signaling make it necessary for a track circuit to have definite operating characteristics, and the manner of meeting these operating characteristics is different for the different forms of energy used. That is, a track circuit for energizing a direct current track relay and a track circuit for operating cab signals require adjustments that are interrelated in some features and are independent in other features.

Again, it is sometimes desirable to have a direct current track circuit polarized in order to provide different controls.

Furthermore, when a track circuit is to be supplied with direct current for one or more functions and with alternating current for still different functions, it is in the interest of simplicity and economy if a single source of power can be used to accomplish the several functions. When direct current and alternating current are supplied to a track circuit, it is desirable if the two can be independently adjusted in order that the direct current can be of a value sufficient to provide proper operation of the track relay with a relatively high shunting sensitivity and to provide broken rail protection, and in order for the alternating current to be of a value to provide an axle current when a train occupies the section that will effectively influence train carried cab signals.

In view of the foregoing conditions, a feature of my invention is the provision of novel and improved track circuit apparatus for supplying a track circuit with current for energizing a direct current track relay and for inductively controlling cab signals.

Another feature of my invention is the provision of novel and improved means for supplying a track circuit with coded direct current of positive and negative polarities to operate polarized code following direct current relays, and for supplying the track circuit with coded alternating current for inductively influencing cab signals, and to supply these different forms of energy from a single source of alternating current.

Another feature of my invention is the provision of novel and improved track circuit apparatus for supplying a track circuit with both alternating and direct currents and which apparatus is arranged in such a manner as to enable the direct current and the alternating current to be independently adjusted as to their values, and to block the flow of the alternating current in the direct current supply means and the flow of direct current in the alternating current supply means.

Other features, objects and advantages of my invention will appear as the specification progresses.

The foregoing features, objects and advantages of my invention are obtained by the provision of a novel circuit network for connecting a track transformer to the track rails, the circuit network being provided with multiple paths which include reactance and resistance in such a manner that certain elements serve to control the direct current component of the track circuit current and other elements serve to control the alternating current component of the track circuit current.

I shall describe several forms of apparatus embodying my invention, and shall then point out the novel features thereof in claims.

In the accompanying drawings, Figs. 1, 2, 3, 4 and 5 are diagrammatic views showing different forms of apparatus each of which embodies my invention.

In each of the several views like reference characters are used to designate similar parts.

Referring to Fig. 1, the reference characters 1a and 1b designate the track rails of a railway over which traffic normally moves in the direction indicated by an arrow, and which rails are formed in the usual manner into a track section D—E, section D—E being ordinarily one section of a series of track sections of a signaling system. The rails 1a and 1b are included in a track circuit which is provided with a track relay means connected across the rails at one end of the section and a source of power connected across the rails at the other end of the section, the power source being a single source of alternating current.

The energy supplied to the track circuit is coded by a coder CD. The coder CD may be any one of several known forms of coding devices, and as here shown it is of the relay type having a contact member which is operated to alternately engage a back contact 13 and a front contact 14 at a preselected code rate of, say 75 times per minute, as long as the operating winding 9 is supplied with current from a suitable source, not shown. It is apparent, of course, that other code rates may be used. The coder CD is continuously operated.

The track relay means includes two polar relays ETR1 and ETR2, the windings 25 and 26 of which are connected in series across the rails adjacent the entrance end E of the section. These two relays are preferably of the biased polar type, that is, the armature is biased to one position when the relay is deenergized, is held at that position when the relay is energized by current of a given polarity, and is operated to its reverse position when the relay is energized by current of the opposite polarity. For example, the relay ETR1 is provided with an armature 27 which is spring biased to the left-hand position as viewed in Fig. 1 when the relay is deenergized. The armature is held in that position when current flows in the winding 25 from the right to the left but when the current flows in the winding in the opposite direction, that is, from the left to the right, the armature 27 is moved to the right-hand position to engage a contact 43. Similarly the polar relay ETR2 is provided with an armature 28 which is spring biased to the right-hand position which is held in that position when current flows in the winding 26 of the relay from the left to the right, but the armature 28 is operated to the left-hand position to engage a contact 33 when current flows in the winding of the relay from the right to the left.

The source of power for the track circuit includes a track transformer DT2, a primary winding 29 of which is connected to the terminals BX and NX of the alternating current source. The transformer DT2 is wound with three independent secondary windings 30, 31 and 32.

The secondary winding 30 is connected across the rails of the section through the resistor 24, front contact 14 of coder CD and lead wires 17 and 18, and coded alternating current is supplied to the rails, this laternating current being available for operation of cab signals. The connection is adjusted for a preselected axle current when a train enters the section under minimum ballast conditions.

The secondary winding 31 is connected across the input terminals of a full-wave rectifier 37, the output terminals of which rectifier are connected to the rails in series with the reactor 20, front contact 14 of coder CT, lead wires 18 and 17 and resistor 21. The rectifier 37 is poled for the polarity of the output terminals to be that indicated by the plus and minus signs placed at the terminals of the rectifier. Thus coded direct current is supplied to the rails, the polarity being such that the rail 1a is positive with respect to rail 1b and current flows in the windings 25 and 26 of the polar relays ETR1 and ETR2 from the right to the left with the result that the relay ETR2 is operated but the relay ETR1 is held at its biased position. The parts are so proportioned that the direct current thus supplied to the track circuit will provide operation of the relay ETR2 with satisfactory shunting sensitivity and broken rail protection.

Code operation of the track relay ETR2 will cause pulses of energizing current to be supplied to a control relay 34 from a source such as a battery, the terminals of which are indicated at B and N. Thus, the control relay 34 is energized by each pulse of current supplied thereto and picks up in response to code operation of relay ETR2. Relay 34 is provided with a slow release characteristic such that the relay remains picked up between the code intervals of the track circuit current. Control relay 34 when picked up closes front contact 36 and completes an obvious circuit for energizing a signal lamp 35.

It is apparent that in Fig. 1 the secondary windings 30 and 31 of the track transformer are connected across the rails in multiple during each code period that the front coder contact 14 is closed and that through the medium of the reactor 20 and the resistor 24 the values of the direct current and the alternating current supplied by these two multiple circuits can be independently adjusted. Also, the reactor 20 is disposed adjacent an output terminal of the rectifier 37 to block the flow of alternating current through the rectifier and the resistor 24 serves to minimize the flow of direct current through the secondary winding 30.

In the form of apparatus shown in Fig. 1 the apparatus includes a control relay 38 which is governed by a simple circuit including a manually operable key 39, with the result that the relay 38 is energized and picked up closing its front contact 41 whenever the key 39 is closed. The relay 38 in turn governs a connection by which the secondary winding 32 is connected across the rails through a full-wave rectifier 42. Specifically, the input terminals of the rectifier 42 are connected across the secondary winding 32 and one output terminal of the rectifier is connected in series with resistor 40, front contact 41 of relay 38, back contact 13 of coder CD and lead wire 18 to rail 1a; and the other output terminal of the rectifier is connected to rail 1b through lead wire 17. The connections are such that the output terminals of the rectifier 42 are of the polarity indicated by the plus and minus signs placed the output terminals of the rectifier and are reversed relative to rectifier 37. Thus the rail 1b is made positive with respect to the rail 1a and a pulse of direct current flows through the windings 25 and 26 of the polar relays from left to right with the result that the armature 27 of relay ETR1 is reversed to the right-hand position and the armature of the polar relay ETR2 is held at its biased position.

The relay ETR1 controls a relay 44, the relay 44 being provided with a pulse of energizing current from the B–N source each time the contact 43 of relay ETR1 is closed. The control relay 44 is thus picked up in response to code operation of the relay ETR1 and relay 44 is provided with a slow release characteristic and its front contact 46 is held closed between the code pulses of the track current. Relay 44 controls at its front contact 46 an obvious circuit for a signal lamp 45. Consequently, when relay 38 is energized code pulses of current are supplied to the track circuit during the off code period of the coder CD for operation of the code following relay ETR1 which in turn governs the signal 45.

Thus, in Fig. 1, a pulse of alternating current and a pulse of direct current are simultaneously supplied to the track rails each on code period of the coder, the alternating current being adjustable for operation of cab signals and the direct current being adjustable for proper operation of the track relay ETR2. Again, when the control relay 38 is closed, a code pulse is supplied to the rails during each off code period and this code pulse of direct current is of a polarity such as to operate the code following relay ETR1 for control of the signal 45. It is to be seen that the circuit network for the supply of energy to the track circuit of the track section of Fig. 1 is composed of three circuit paths which are independently adjustable.

Figure 2:
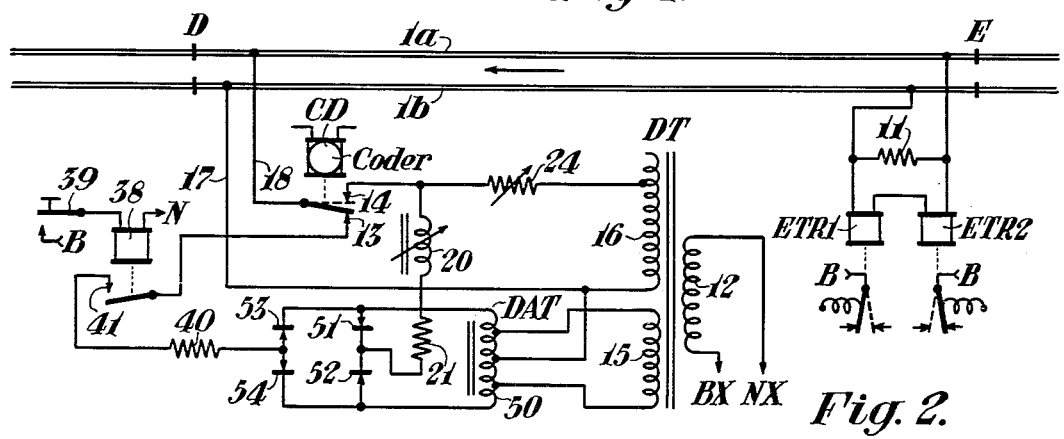

It may occur that a railroad is equipped with track circuits that are provided with a track transformer having two independent secondary windings, one used for supplying alternating current to the track rails and one used for supplying rectified current to the rails, and that at a later date the railroad desires to convert these track circuits so as to provide a polar control. Under these circumstances it is in the interest of economy if new multiple winding track transformers are not required and the track transformers having the two independent secondary windings can remain in service. In Fig. 2, there is disclosed apparatus embodying my invention which provides a polar control with a track transformer having only two secondary windings. In Fig. 2, the secondary winding 16 of track transformer DT is connected to the rails through a circuit including resistor 24 and coder contact 14 for supplying coded alternating current for operation of cab signals the same as in Fig. 1. The second secondary winding 15 of the track transformer DT is connected across a given portion of the winding 50 of an autotransformer DAT. Winding 50 is provided with a mid-terminal and its outside terminals are connected across rectifiers 51 and 52 arranged as a full-wave rectifier of the two-leg type, the rectifiers 51 and 52 being connected in series and poled reverse to each other. The junction terminal of the rectifiers 51 and 52 and the mid terminal of the winding 50 are connected across the rails through resistor 21, reactor 20, coder contact 14 and lead wires 18 and 17, and full-wave rectified current is supplied to the track circuit each on code period of the coder. The rectifiers 51 and 52 are poled as indicated and the junction terminal of the rectifiers is positive with the result that the rail 1a is positive with respect to rail 1b. Consequently with the code following relays ETR1 and ETR2 connected across the rails at the entrance end of the section of Fig. 2, in the manner indicated in Fig. 1, the relay ETR2 will be operated by the direct current pulses supplied during the on code periods.

The winding 50 of the autotransformer DAT is also connected to a second full-wave rectifier comprising rectifiers 53 and 54 connected in series and poled reverse to each other. The junction terminal of rectifiers 53 and 54 and the intermediate terminal of winding 50 are connected to the rails through resistance 40, front contact 41 of control relay 38, back contact 13 of the coder CD and lead wires 18 and 17. The rectifiers 53 and 54 are poled for the junction terminal of the rectifiers 53 and 54 to be the negative terminal and the code pulses of direct current supplied to the rails through the rectifiers 53 and 54 cause the rail 1b to be positive with respect to the rail 1a, and the code following relay ETR1 will be operated during the off code periods of the coder CD.

It is clear that with the apparatus of Fig. 2 the circuit paths by which alternating current and direct current are supplied to the rails can be independently adjusted and controlled the same as in Fig. 1.

The autotransformer DAT would be small and simple with fixed voltage taps. It is not required to carry a direct current component and has to be large enough only to match the voltage and current capacity of the rectifiers.

Figure 3:
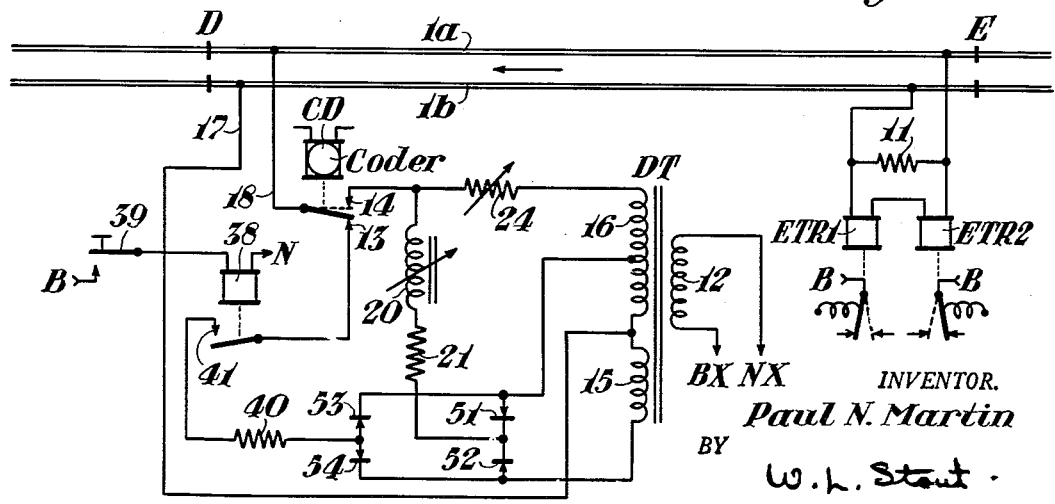

Fig. 3 discloses a modification wherewith the two secondary windings 15 and 16 of the track transformer DT are arranged to supply coded alternating current and polarized coded direct current to the track circuit. The secondary winding 16 is connected across the rails through resistor 24, coder contact 14 and lead wires 18 and 17 to supply to the rails coded alternating current which is available for operation of the cab signals. The lower terminal of the secondary winding 16 as viewed in Fig. 3, is connected to the upper terminal of the secondary winding 15. Secondary winding 16 also is provided with an intermediate terminal which is disposed so that the lower portion of the secondary winding 16 gives approximately the same voltage as the secondary winding 15. This intermediate terminal of secondary winding 16 is connected to the rail 1a through rectifier 51 in its forward direction, resistance 21, reactor 20, coder contact 14 and lead wire 18; and the lower terminal of the secondary winding 15 is connected to the rail 1a through rectifier 52 in its forward direction and the previously traced circuit, while the junction terminal of the two windings 15 and 16 is connected to the rail 1b through lead wire 17. With the rectifiers 51 and 52 poled as shown in Fig. 3, the polarity of the direct current pulse supplied to the rails each on code period of the coder causes the rail 1a to be positive with respect to the rail 1b and the code following relay ETR2 is operated in response to this code pulse of direct current.

Again, the lower portions of winding 16 and the winding 15 are connected to the rails by a circuit that includes rectifiers 53 and 54, resistor 40, front contact 41 of control relay 38 and the back contact 13 of the coder. With the rectifiers 53 and 54 poled as shown in Fig. 3, the pulse of direct current supplied to the rails during the off code period is of the polarity that causes the rail 1b to be positive with respect to rail 1a and the code following relay ETR1 would be operated by such code pulse.

Consequently in Fig. 3 the secondary windings 16 and 15 are connected to the rails by multiple circuits for supplying alternating current and direct current and these multiple circuits permit the alternating current and the direct current to be independently adjusted as to their values.

It is to be pointed out that in Figs. 2 and 3, the rectifiers 51, 52, 53 and 54 are the equivalent of a single 4-legged bridge type rectifier which rectifier with the center tapped supply winding 50 in Fig. 2 or the center tapped winding comprising winding 15 and the lower portion of winding 16 in Fig. 3, form a three-wire direct current supply means.

Figure 4:
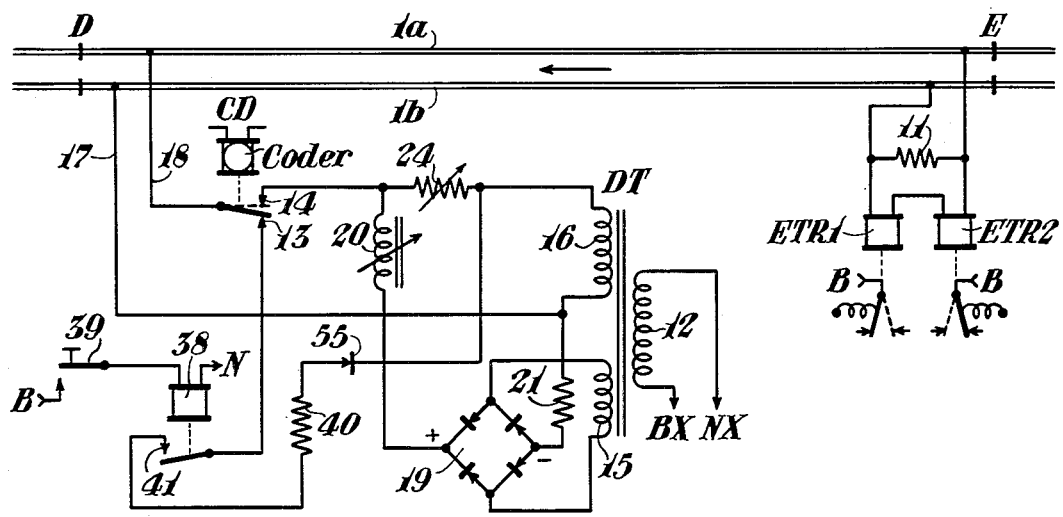

In the form of the apparatus shown in Fig. 4, the secondary winding 16 of the track transformer DT is used to supply the alternating current to the track circuit through the resistor 24 and coder contact 14 the same as before. The secondary winding 15 is connected to the input terminals of a full-wave rectifier 19, the output terminals of which are connected to the rails through reactor 20, coder contact 14 and resistor 21. Thus the code pulse of direct current applied to the rails during the on code period is of a polarity which causes the rail 1a to be positive with respect to the rail 1b and the code following relay ETR2 is operated. In Fig. 4, the secondary winding 16 is connected to the rails during the off code period through a connection including the coder contact 13, front contact 41 of control relay 38, resistor 40 and a half-wave rectifier 55. The rectifier 55 is poled so that the rectified current pulse supplied to the rails during the off code period is of a polarity that causes the rail 1b to be positive with respect to the rail 1a and the code following relay ETR1 is operated by the half-wave rectified current pulse.

Figure 5:
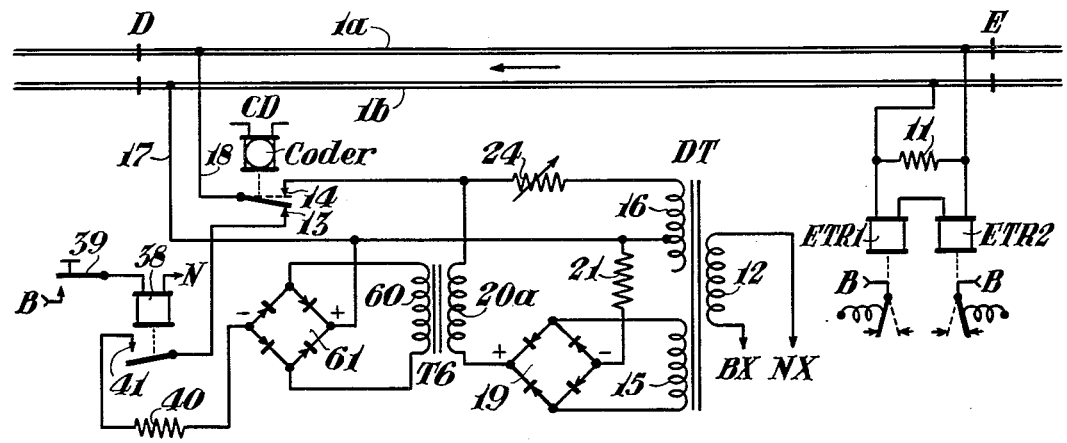

In the form of the apparatus disclosed in Fig. 5, the secondary windings 15 and 16 of the track transformer DT are connected across the rails in multiple the same as before but the reactor 20 of the former arrangements is replaced by a transformer T6, a primary winding 20a of which serves as a reactance in the connection of the output terminals of the rectifier 19 to the rails.

Specifically, secondary winding 16 of transformer DT is connected across the rails through resistor 24, front coder contact 14 and lead wires 17 and 18. The other secondary winding 15 of transformer DT is connected to the input terminals of the rectifier 19 and the output terminals of rectifier 19 are connected across the rails through winding 20a, front contact 14 of the coder, lead wires 18 and 17 and resistor 21. The connections are such that rail 1a is positive with respect to rail 1b and the relay ETR2 is operated.

A secondary winding 60 of the transformer T6 is connected across the input terminal of a full-wave rectifier 61. The primary winding 20a of transformer T6 is energized in part from secondary winding 16 through a circuit including resistor 21, rectifier 19 between its minus and plus terminals and resistor 24, this rectifier 19 being in a half-wave arrangement in this circuit. The rectifier is still connected in the full-wave, bridge arrangement to secondary winding 15 with the result that a current having an alternating and a direct current component flows in the primary winding 20a. When contact 41 of relay 38 and back contact 13 of coder CD are closed, the rectifier 61 is connected to the rails, and the alternating current component of the energy in the primary winding 20a is useful to supply a pulse of direct current to the track circuit, the output terminals of rectifier 61 being connected across the rails through resistor 40, front contact 41 of control relay 38, and back contact 13 of the coder. The connections of the rectifier 61 are such that the polarity of the pulse of current is that indicated by the plus and minus signs placed on the output terminals of the rectifier 61 and consequently the pulse of current in the rails is of the polarity that causes the rail 1b to be positive with respect to the rail 1a and the polar code following relay ETR1 is operated by this pulse of track circuit current supplied during the off code period. The transformer T6 would be proportioned to have substantially the same reactance in the primary circuit when the secondary circuit is open as the reactor 20 of the previous forms of the apparatus. Thus the primary winding 20a serves as a reactance when the secondary winding 15 is connected to the track circuit during the on code period. It is to be seen that in both of the forms shown in Figs. 4 and 5 the connections of the secondary windings 15 and 16 of the track transformer include multiple circuit paths which can be independently adjusted. Also, in Figs. 4 and 5, a polar control is obtained from the one track transformer.

Although I have herein shown and described several forms of track circuit apparatus embodying my invention, it is understood that various changes and modifications may be made therein within the scope of the appended claims without departing from the spirit and scope of my invention.

Having thus described my invention, what I claim is:

1. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer provided with a primary winding and a plurality of secondary windings, said primary winding being connected to said current source, a first and a second rectifier, a reactor, a resistor, a coder having an on and an off contact which are alternately closed at a given code rate, said first rectifier having connections for receiving energy from a first one of said secondary windings; a first circuit including said first rectifier, said reactor and said on coder contact connected across the rails adjacent the exit end of said section to supply code pulses of direct current of a given polarity for correspondingly energizing said track relay means; a second circuit including said resistor and said on coder contact to connect a second one of said secondary windings across the rails adjacent the exit end of said section to supply code pulses of alternating current to inductively influence cab signals when a train traverses the section, said second rectifier having connections for receiving energy from a given one of said secondary windings of said transformer, a third circuit including said second rectifier and said off coder contact connected across the rails adjacent the exit end of the section to supply at selected times code pulses of direct current of a polarity opposite said given polarity to correspondingly energize said polar track relay means, each said circuit including an impedance means whereby the value of said current pulses supplied by each said circuit may be independently adjusted to provide safe operation of said track circuit.

2. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer provided with a primary winding and a plurality of secondary windings, said primary winding being connected to said current source, a first and a second rectifier, a reactor, a resistor, a coder having an on and an off contact which are alternately closed at a given code rate; a first circuit means including a given one of said secondary windings, said first rectifier, said reactor and said on coder contact connected across the rails adjacent the exit end of said section to supply code pulses of direct current to said track circuit to energize said track relay means; said first circuit means having connections to cause said pulses of direct current to have a given polarity; a second circuit means including another one of said secondary windings, said resistor and said on coder contact connected across the rails adjacent the exit end of said section to supply code pulses of alternating current for inductive operation of cab signals; and a third circuit means including a selected one of said secondary windings, said second rectifier and said off coder contact connected to the rails adjacent the exit end of the section to supply at selected times code pulses of direct current for energizing said track relay means, and said third circuit means having connections to cause said last mentioned code pulses to have a polarity opposite said given polarity.

3. In combination, a track section the rails of which are included in a track circuit and through which section trains equipped with inductive cab signals at times move in a given direction, a direct current polar code following relay means connected across the rails adjacent the entrance end of said section, a source of alternating current, a transformer provided with a primary winding and three independent secondary windings, said primary winding being connected to said current source, a first and a second full-wave rectifier, a reactor, a first and a second and a third resistor, a coder having an on and an off contact which are alternately closed at a given code rate; a first circuit means including in series a given one of said secondary windings, said first rectifier, said reactor, said on coder contact and said first resistor and connected to the rails to supply pulses of direct current for energizing said relay means; said first rectifier poled for said current pulses to be of a given polarity; a second circuit means including in series a second one of said secondary windings, said second resistor and said on coder contact to supply pulses of alternating current for operation of cab signals; a third circuit means including in series a third one of said secondary windings, said second rectifier, said third resistor and said off coder contact and connected to the rails to supply at selected times pulses of direct current for energizing said relay means, said second rectifier poled for the last mentioned current pulses to be of the polarity opposite said given polarity, each said circuit means being independently adjusted to vary its impedance to limit the value of said current pulses to provide safe operation of said track circuit.

4. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer provided with a primary winding and a first and a second secondary winding, said primary winding being connected to said current source, an autotransformer, a first and a second rectifier, a reactor, a first and a second and a third resistor, a coder having an on and an off contact which are alternately closed at a given code rate, said first secondary winding connected to said autotransformer; a first circuit means including said first rectifier, said first resistor, said reactor and said on coder contact to connect said autotransformer across the rails of said section to supply pulses of direct current for energizing said track relay means; said first circuit means being poled for said current pulses to be of a given polarity; a second circuit means including said second resistor and said on code contact to connect said second secondary winding to said rails of said section to supply pulses of alternating current for inductive operation of cab signals; a third circuit means including said second rectifier, said third resistor and said off coder contact to connect said autotransformer to the rails of said section to supply at selected times pulses of direct current for energizing said track relay means; said third circuit means connected for said last mentioned pulses of current to be of the polarity opposite said given polarity, each said circuit means being independently adjusted to vary its impedance to limt the value of said current pulses to provide safe operation of said track circuit.

5. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer provided with a primary winding and a first and a second secondary winding, said primary winding being connected to said current source, said second secondary winding provided with an intermediate terminal and having a selected one of its outside terminals joined to a selected one of the outside terminals of said first secondary winding, a first and a second rectifier, a reactor, a first and a second and a third resistor, a coder having an on and an off contact which are alternately closed at a given code rate; a first circuit means including said first rectifier, said first resistor, said reactor and said on coder contact to connect the nonselected outside terminal of said first secondary winding and said intermediate terminal of said second secondary winding and said junction terminal of said secondary windings to the rails of said section in such a manner as to supply pulses of direct current for energizing said track relay means; said first rectifier poled for said current pulses to be of a given polarity; a second circuit means including said first resistor and said on coder contact to connect the other outside terminal of the second secondary winding and said junction terminal of said secondary windings to the rails of the section to supply pulses of alternating current for inductive operation of cab signals; a third circuit means including said second rectifier, said third resistor and said off coder contact to connect said nonselected outside terminal of said first secondary winding and said intermediate terminal of said second secondary winding and said junction terminal of the secondary windings to the rails of the section in such a manner as to supply at selected times pulses of direct current for energizing said track relay means, said second rectifier poled for said last mentioned current pulses to be of the polarity opposite said given polarity, each said circuit means being independently adjusted to vary its impedance to limit the value of said current pulses to provide safe operation of said track circuit.

6. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer provided with a primary winding and a first and a second secondary winding, said primary winding being connected to said current source, a full-wave rectifier, a half-wave rectifier, a reactor, a first and a second and a third resistor, a coder having an on and an off contact which are alternately closed at a given code rate; a first circuit means including said full-wave rectifier, said reactor, said on coder contact and said first resistor to connect said first secondary winding to the rails of said section to supply pulses of direct current for energizing said track relay means, said full-wave rectifier poled for said current pulses to be of a given polarity, a second circuit means including said second resistor and said on coder contact to connect said second secondary winding to the rails of said section to supply pulses of alternating current for inductive operation of cab signals; a third circuit means including said half-wave rectifier, said third resistor, and said off coder contact to connect said second secondary winding to the rails of said section to supply at selected times pulses of direct current for energizing said track relay means, said half-wave rectifier poled for the last mentioned pulses of current to be of the polarity opposite said given polarity, each said circuit means being independently adjusted to vary its impedance to limit the value of said current pulses to provide safe operation of said track circuit.

7. In combination, a track section the rails of which are included in a track circuit and through which section trains equipped with inductive cab signals at times move in a given direction, a direct current polar code following track relay means connected across the rails adjacent the entrance end of said section, a source of alternating current, a transformer having a primary winding and a first and a second secondary winding, said primary winding being connected to said current source, a first and a second rectifier, another transformer, a first and a second and a third resistor, a coder having an on and an off contact which are alternately closed at a given code rate; a first circuit means including said first rectifier, a primary winding of said another transformer, said first resistor and said on coder contact to connect said first secondary winding to the rails of the section to supply pulses of direct current for energizing said track relay means; said first rectifier poled for said current pulses to be of a given polarity; a second circuit means including said second resistor and said on coder contact to connect said second secondary winding to the rails of said section to supply pulses of alternating current for inductive operation of cab signals; a third circuit means including said second rectifier, said third resistor and said off coder contact to connect a secondary winding of said another transformer to the rails of said section to supply at selected times pulses of direct current for energizing said track relay means, said second rectifier poled for the last mentioned current pulses to be of the polarity opposite said given polarity, each said circuit means being independently adjusted to vary its impedance to limit the value of said current pulses to provide safe operation of said track circuit.

8. In combination, an alternating current source, transformer means having connections for receiving power from said source and having a secondary winding provided with an intermediate terminal for supplying alternating voltages, a first and a second rectifier each comprising two rectifying elements connected in series and poled to oppose each other, the elements of the first rectifier being poled reverse to the elements of the second rectifier, each said rectifier having the outside terminals of its elements connected across the outside terminals of said secondary winding, a common lead wire connected to said intermediate terminal of the secondary winding, a first circuit connected between the junction terminal of the elements of said first rectifier and said common lead wire to receive direct current of one polarity, and a second circuit connected between the junction terminal of the elements of said second rectifier and said common lead wire to receive direct current of the polarity opposite said one polarity.

9. In combination, a track section the rails of which are included in a track circuit, a direct current polar relay means connected across the rails at one end of said section, a source of alternating current, a transformer provided with a primary winding and a center tapped secondary winding, said primary winding having connections for receiving power from said source, a first and a second rectifier, each said rectifier comprising two rectifier elements connected in series and poled to oppose each other, the elements of the first rectifier being poled reverse to the elements of the second rectifier, each said first and second rectifier having the outside terminals of its two elements connected across the outside terminals of said secondary winding, a first and a second circuit controlling contact, means including said first contact to connect the junction terminal of the elements of said first rectifier and the center tap terminal of said secondary winding to the rails of said section to energize said relay means at a given polarity, and other means including said second contact to connect at selected times the junction terminal of the elements of said second rectifier and the center tap terminal of said secondary winding to the rails of said section to energize said relay means at the polarity opposite said given polarity.

10. In combination, a track section the rails of which are included in a track circuit and through which section trains equipped with inductive cab signals at times move in a given direction, a direct current polar code following track relay means connected across the rails adjacent the entrance end of said section, a source of alternating current, transformer means having a primary winding connected to said source and having secondary windings provided with intermediate taps, a first and a second rectifier each comprising two rectifying elements connected in series and poled to oppose each other, the elements of said first rectifier being poled reverse to the elements of said second rectifier, each said rectifier having its outside terminals connected across a selected portion of said secondary windings, said selected portion having a center tap; a reactor, a resistor, a coder having an on and an off contact which are alternately closed at a given code rate; a first circuit means including the junction terminal of said elements of said first rectifier, said reactor, said on coder contact, and said center tap to connect said selected portion of said secondary windings to said rails of said track section to supply pulses of direct current for energizing said track relay means, said first circuit means being poled for said current pulses to be of a given polarity; a second circuit means including said resistor and said on coder contact to connect another portion of said secondary windings to said rails to supply pulses of alternating current for inductive operation of said cab signals; a third circuit means including the junction terminal of said elements of said second rectifier, said off coder contact, and said center tap to connect, at selected times, said selected portion of said secondary windings to said rails to supply pulses of direct current for energizing said track relay means, said third circuit means being poled for said last mentioned current pulses to be of the polarity opposite said given polarity; each said circuit means including an impedance means whereby the value of said current pulses supplied by each said circuit means may be independently adjusted to provide safe and proper operation of said track circuit.

References Cited in the file of this patent

UNITED STATES PATENTS

| | | |
|---|---|---|
| 2,331,815 | Thompson | Oct. 12, 1943 |
| 2,465,691 | Martin | Mar. 29, 1949 |
| 2,581,527 | Gilson | Jan. 8, 1952 |